(12) United States Patent
Luckhardt et al.

(10) Patent No.: US 11,674,692 B2
(45) Date of Patent: *Jun. 13, 2023

(54) FOOD PREPARATION ENTITY

(71) Applicant: ELECTROLUX APPLIANCES AKTIEBOLAG, Stockholm (SE)

(72) Inventors: Christoph Luckhardt, Rothenberg ob der Tauber (DE); Fabienne Reinhard-Herrscher, Schnelldorf (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 134 days.

This patent is subject to a terminal disclaimer.

(21) Appl. No.: 17/227,607

(22) Filed: Apr. 12, 2021

(65) Prior Publication Data

US 2021/0231312 A1    Jul. 29, 2021

Related U.S. Application Data

(63) Continuation of application No. 16/476,351, filed as application No. PCT/EP2018/050357 on Jan. 8, 2018, now Pat. No. 11,022,320.

(30) Foreign Application Priority Data

Jan. 10, 2017  (EP) .................................... 17150812

(51) Int. Cl.
   *G06V 20/64*   (2022.01)
   *F24C 7/08*    (2006.01)
   *G06V 20/80*   (2022.01)

(52) U.S. Cl.
   CPC ............ *F24C 7/085* (2013.01); *G06V 20/647* (2022.01); *G06V 20/80* (2022.01); *A47J 2202/00* (2013.01)

(58) Field of Classification Search
   CPC ...... G06V 20/64; G06V 20/647; G06V 20/68; G06T 7/50; G06T 7/55; G06T 7/557;
   (Continued)

(56) References Cited

U.S. PATENT DOCUMENTS 5,361,127 A     11/1994  Daily
2015/0285513 A1*  10/2015  Matarazzi et al. ...... F24C 7/085
                                                    99/342

(Continued)

FOREIGN PATENT DOCUMENTS

DE     102013110642 A1   3/2015
EP         3067828 A1   9/2016
WO     WO2016034295 A1   3/2016

OTHER PUBLICATIONS

International Search Report and Written Opinion iin PCT/EP2018/050357 dated Jul. 23, 2018, 10 pages.

*Primary Examiner* — Andrew W Johns
(74) *Attorney, Agent, or Firm* — Pearne & Gordon LLP

(57) ABSTRACT

The invention relates to a method for calculating three-dimensional information of food received within a cavity of a food preparation entity, the method comprising the steps of: capturing at least one image of said food received within the cavity by a plenoptic camera, said image comprising information regarding the light intensity and the direction of light rays traveling in space; or capturing at least two images of said food received within the cavity, said images being taken from different positions during movement of a camera; or capturing at least two images of said food received within the cavity using a camera, said images comprising different focus points; and processing the at least one image in order to establish three-dimensional information of said food received within the cavity.

17 Claims, 3 Drawing Sheets

(58) Field of Classification Search
CPC ........... G06T 7/571; G06T 7/593; G06T 7/97; G06T 2207/10028; G06T 2207/10052; G06T 2207/10148; F24C 3/12; F24C 3/126; F24C 3/128; F24C 5/16; F24C 7/08; F24C 7/082; F24C 7/085; A47J 37/00; A47J 2202/00
See application file for complete search history.

(56) References Cited

U.S. PATENT DOCUMENTS

| | | |
|---|---|---|
| 2017/0115008 A1 | 4/2017 | Erbe et al. |
| 2017/0261213 A1 | 9/2017 | Park et al. |
| 2018/0324908 A1 | 11/2018 | Denker et al. |
| 2019/0014625 A1 | 1/2019 | Matsui et al. |

* cited by examiner

FOOD PREPARATION ENTITY

CROSS-REFERENCE TO RELATED APPLICATIONS

This application is a continuation of U.S. patent application Ser. No. 16/476,351 filed Jul. 8, 2019, the contents of which are incorporated by reference.

BACKGROUND OF THE INVENTION

The present invention relates generally to the field of food preparation entities. More specifically, the present invention is related to a food preparation entity adapted to determine the three-dimensional shape of food received within a cavity of the food preparation entity.

Food preparation entities, for example baking ovens, are well known in prior art. Such food preparation entities comprise a cavity for receiving food to be cooked or baked and a door for closing the cavity during the food preparation process. The food preparation entity may comprise an image recognition system for capturing optical information of said food received within the cavity.

SUMMARY OF THE INVENTION

It is an objective of embodiments of the present invention to provide a food preparation entity which is adapted to establish three-dimensional information of the food to be cooked based on optical information captured by a camera with limited technical effort. If not explicitly indicated otherwise, embodiments of the invention can be freely combined with each other.

According to a first aspect, the invention relates to a method for calculating three-dimensional information of food received within a cavity of a food preparation entity. The method comprises the steps of:

capturing at least one image of said food received within the cavity by a plenoptic camera, said image comprising information regarding the light intensity and the direction of light rays traveling in space; or capturing at least two images of said food received within the cavity, said images being taken from different positions during movement of a camera; or capturing at least two images of said food received within the cavity using a camera, said images comprising different focus points; and processing the at least one image in order to establish three-dimensional information of said food received within the cavity.

So, either an image of a plenoptic camera comprising information of an image series with multiple different focus points or two or more images with different focus points or captured from different positions can be used for establishing 3D-information of the food included in the cavity.

Said method is advantageous because said 3D-information can be obtained with reduced technical effort. For example, the usage of multiple cameras (stereoscopy), one or more light sources (e.g. laser scanners, structured light etc.) or distance sensors can be avoided. Preferably, only a single camera can be used for establishing said 3D-information.

According to embodiments, said plenoptic camera uses an array of lenses, specifically micro-lenses for gathering information regarding the direction of light rays. Based on said light direction information it is possible to dynamically vary the focal plane. So, with only a single captured image it is possible to shift the focus point through the 3D shape of the food to be cooked, thereby obtaining 2D slice information of the food.

According to embodiments, the camera is mounted at a door of said food preparation entity and said movement is obtained by closing and/or opening said door. During said movement of the door multiple images can be captured, wherein each image refers to a certain point of view. Thereby, images from different perspectives can be captured.

According to embodiments, the camera is arranged at or within a door handle or the camera is included in the structure of said door. Thereby an easy integration of the camera into the food preparation entity can be obtained.

According to embodiments, multiple images are captured according to a slanted top-down view. By integrating the camera at or in an upper part of the door, a set of images showing different slanted top-down views can be captured which result in an improved recognition of the 3D shape of the food included in the cavity.

According to embodiments, during image processing, the position of the camera at the point of time, at which the respective image is captured, is taken into account. Based on position information of the camera and the outer contour of the food extracted from the respective image, the 3D shape of the food can be established.

According to embodiments, the position of the camera is determined by considering a trigger occurring during closing said door. Said trigger can be provided by a certain kind of sensor (distance sensor or angular sensor) or a switch, e.g. a door switch indicating the closed position of the door.

According to embodiments, the position of the camera is determined by considering one or more known fixed points at the food preparation entity, specifically within the cavity of the food preparation entity. Said fixed points may be, for example, the position of the fan, the fan cover etc. Said fixed points can be detected within the captured images and can be used for determining the position at which the camera has been located when capturing the image.

According to embodiments, said three-dimensional information of food received within the cavity is processed by triangulation of multiple points of the food received within the cavity. Knowing the position of the camera when capturing an image and the contour of the food in the respective image it is possible to establish 3D shape information of said food by triangulation methods.

According to embodiments, a camera comprising camera optics adapted to change the focus point is used for image capturing. Thereby, multiple different images associated with different focal planes can be generated by varying the focus point of the camera optics. Preferably, said multiple images are captured at the same position of the door (i.e. fixed position of the door). However, according to other embodiments, it may be possible to capture said images while moving the door.

According to embodiments, the volume change of the food received within the cavity is estimated based on said three-dimensional information of food received within the cavity and one or more further two-dimensional images which are captured during the cooking process. After establishing 3D-information of the food, the volume change during the further cooking process can be monitored by capturing 2D-images of said food and calculating based on said established 3D-information and said 2D-images the volume change of the food. Said 2D-images can be captured periodically or triggered by certain events.

According to embodiments, the temperature inside the food is determined based on the surface temperature of said food received within the cavity and said established three-dimensional information of said food. Thereby it is possible to estimate the cooking status of the food received within the cavity.

According to embodiments, the position of a temperature sensor portion protruding from the food received within the cavity is determined, information regarding the distance between the centre of said food and a sensing portion of the temperature sensor is calculated and temperature information provided by said temperature sensor is adjusted based on said information regarding the distance between the centre of said food and the sensing portion of the temperature sensor. Thereby it is possible to correct the centre temperature, said temperature correction being desirable because of an imprecise positioning of the temperature sensor.

According to embodiments, said established three-dimensional information of food received within the cavity is used for categorizing said food according to certain food types. Thereby it may be possible to decide whether a pastry or a piece of meat is included in the cavity. In addition, it may be possible to suggest certain cooking programs or cooking parameters based on the recognized food type.

According to a further aspect, the invention relates to a food preparation entity comprising a cavity for receiving food, a door for closing said cavity and a camera for capturing one or more images of said food received within the cavity. Furthermore, the food preparation entity is adapted to:

capture at least one image of said food received within the cavity by a plenoptic camera, said image comprising information regarding the light intensity and the direction of light rays traveling in space; or capture at least two images of said food received within the cavity, said images being taken from different positions during a movement of a camera; or capture at least two images of said food received within the cavity, said images comprising different focus points; and process the at least one image in order to establish three-dimensional information of said food received within the cavity.

The term "food preparation entity" as used in the present disclosure may refer to any appliance which can be used for preparing food, specifically ovens, steam ovens, microwave ovens or similar frying, baking or cooking appliances.

The term "food type" as used in the present disclosure may refer to a certain kind of food or dish, for example, a certain cake or pie (e.g. apple pie), a certain roast (pork, beef, poultry), pizza etc. However, the term "food type" can also refer to a certain class of food, wherein such classes of food can be, for example, cake, roast, vegetables, gratin, etc.

The term "essentially" or "approximately" as used in the present disclosure means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
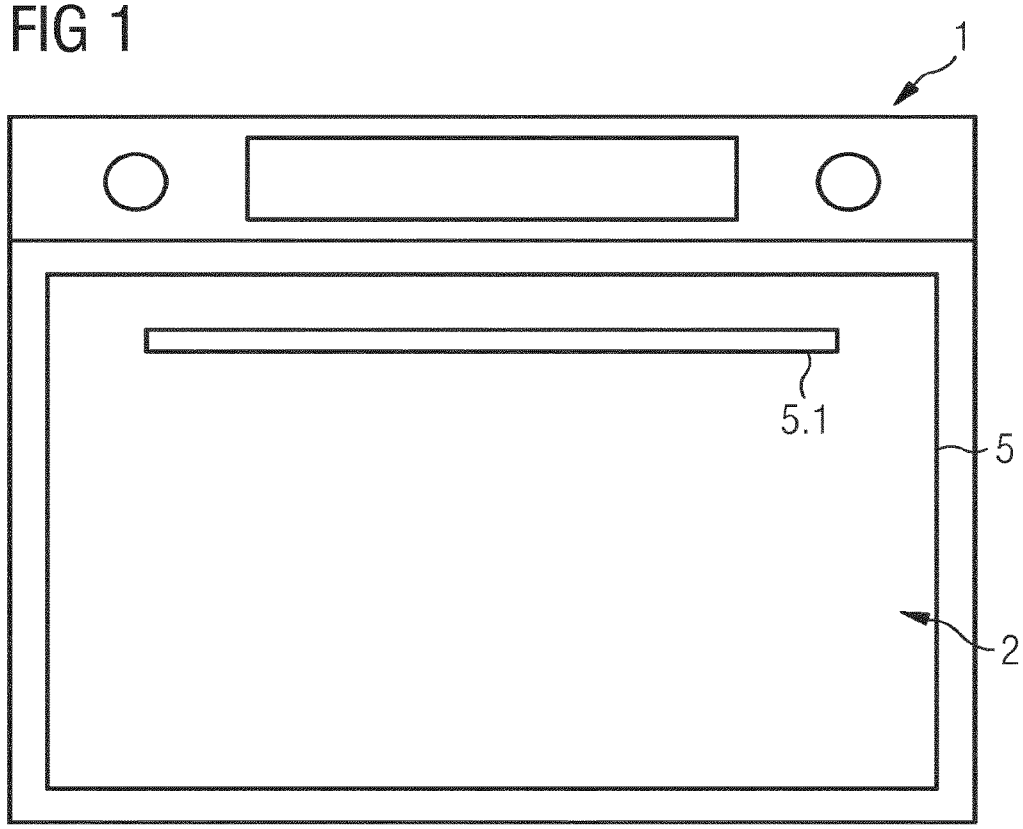
FIG. 1 shows an example schematic view of a food preparation entity.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic illustration of a food preparation entity 1. In the present example, the food preparation entity 1 is a baking oven. The food preparation entity 1 comprises a base body in which a cavity 2 for receiving food to be prepared is provided. The food preparation entity 1 may comprise a door 5 for closing the cavity 2 during the food preparation process. In addition, the food preparation entity 1 may comprise an image capturing system. The image capturing system may be, for example, a camera 4, specifically a digital camera adapted to capture optical information of the food received within the cavity 2. Said optical information may be one or more digital images. Preferably, the food preparation entity 1 comprises only a single camera 4. Based on said one or more digital images the food preparation entity is adapted to establish three-dimensional (3D) information of said food received within the cavity 2.

Figure 2:
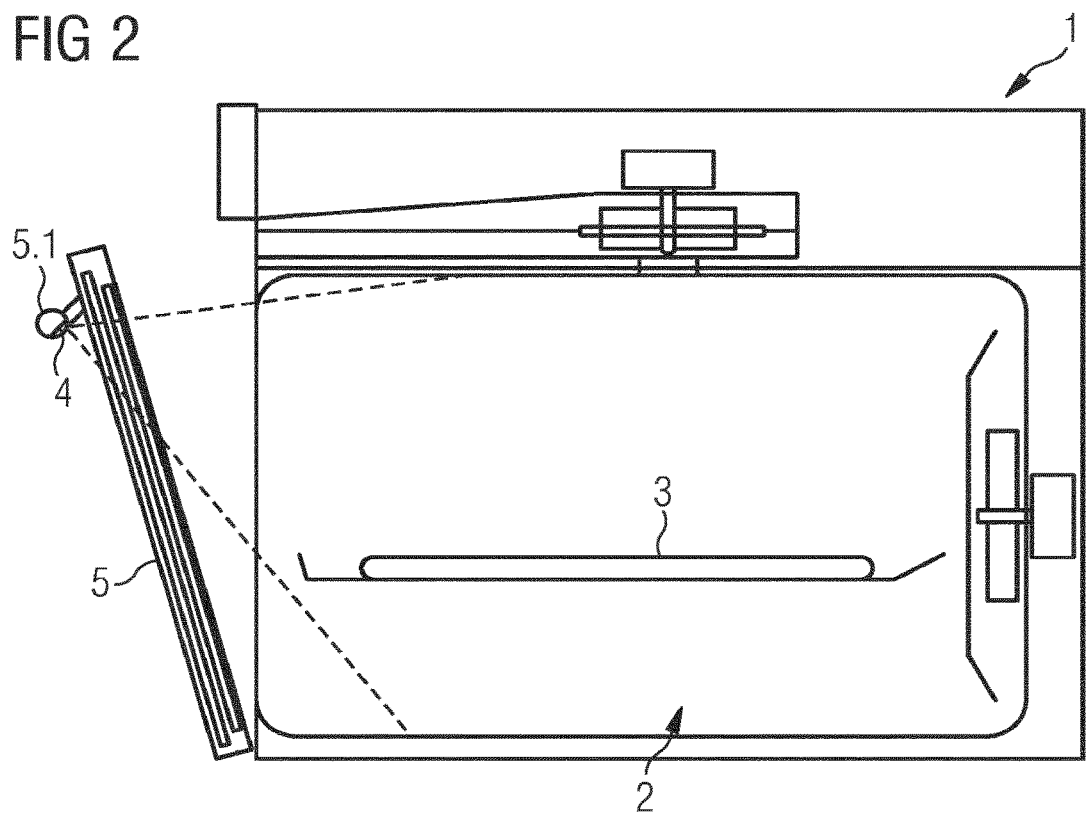
FIG. 2 shows the angled view of a camera onto the food received within the cavity when the door is partly opened.
Figure 3:
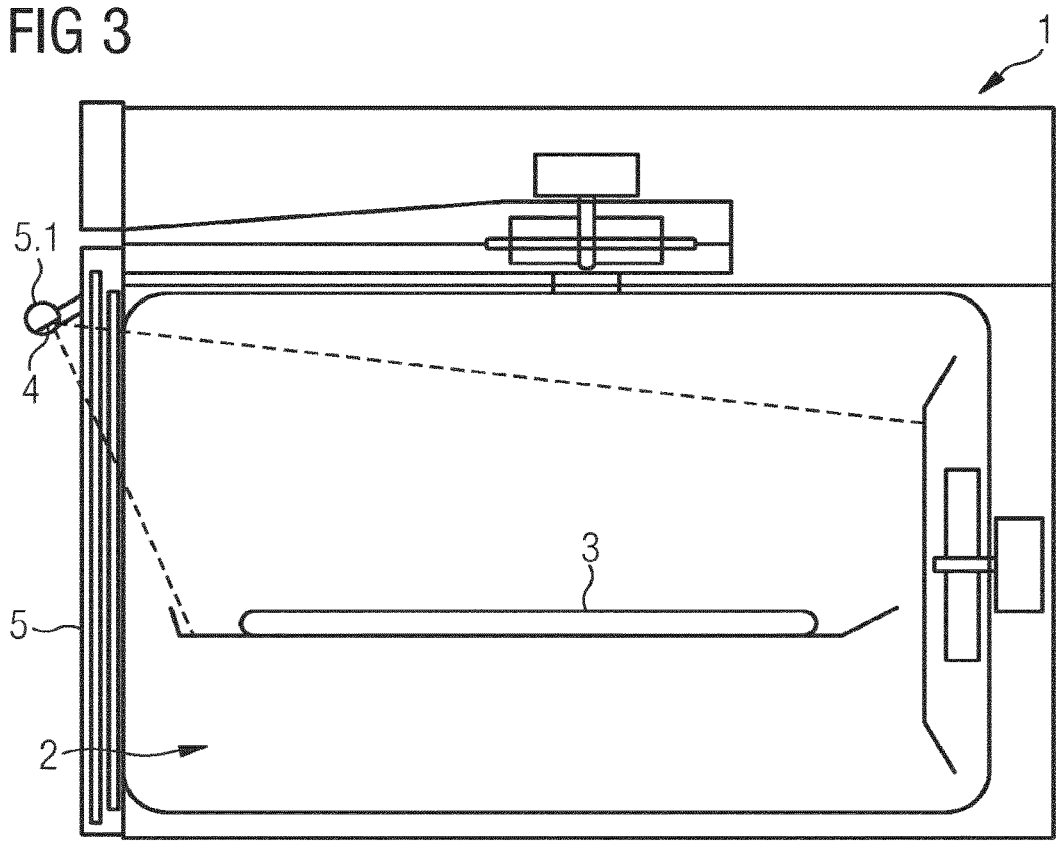
FIG. 3 shows the angled view of a camera onto the food received within the cavity when the door is closed.

FIGS. 2 and 3 shows a first embodiment of a food preparation entity 1. The food preparation entity 1 is adapted to capture several pictures during a movement of said camera 4. According to the present embodiment, said camera movement is obtained by a movement of the door 5 (opening and/or closing movement). More in detail, said camera 4 may be arranged at or within a handle 5.1 of the door 5. Alternatively, said camera 4 may be arranged at said door 5 or may be included in the interior of said door 5. According to other embodiments, said movement of the camera can also be obtained by other camera moving means, for example a sliding arrangement of the camera 4 within the cavity 2.

Said camera 4 may be adapted to capture two or more images at different positions in order to obtain different images from different point of views. As shown in FIGS. 2 and 3, said camera 4 may be adapted to capture images in a slanted top-down-view. For example, during closing the door 5, the camera 4 captures two or more images (e.g. a series of images) of the food 3 received within the cavity 2 in different angular positions of the door 5. Thereby it is possible to obtain images of the food 3 from different perspectives.

In order to establish 3D image information, i.e. information regarding the spatial distribution of the food 3 based on said two or more images, information regarding the current position of the camera 4 at the point of time at which the respective image is captured should be available. Therefore, the food preparation entity 1 may be adapted to gather information regarding the current position of the door 5. Said position can be determined based on a sensor providing information regarding the current position of the door (angle sensor, distance sensor etc.) or based on a door switch (which may trigger said image capturing).

Alternatively, it may be possible to calculate the position of the camera 4 based on reference points or reference structures within the captured images. Such reference points or reference structures may be located at the food preparation entity 1, specifically at or within the cavity 2 of the food preparation entity 1. For example the position of the fan cover within the image can be used to calculate the position of the camera 4 at which the image has been captured.

Based on said two or more images from different positions it is possible to calculate 3D-information of the food 3 or object received within the oven cavity by triangulation of multiple points of said food 3. Since the position of the camera at which a certain image was taken is known, distinctive points which can be found in more than one image can be located in the 3D-space by using basic perspective projection techniques and triangulation of the position of the individual points.

Figure 4:
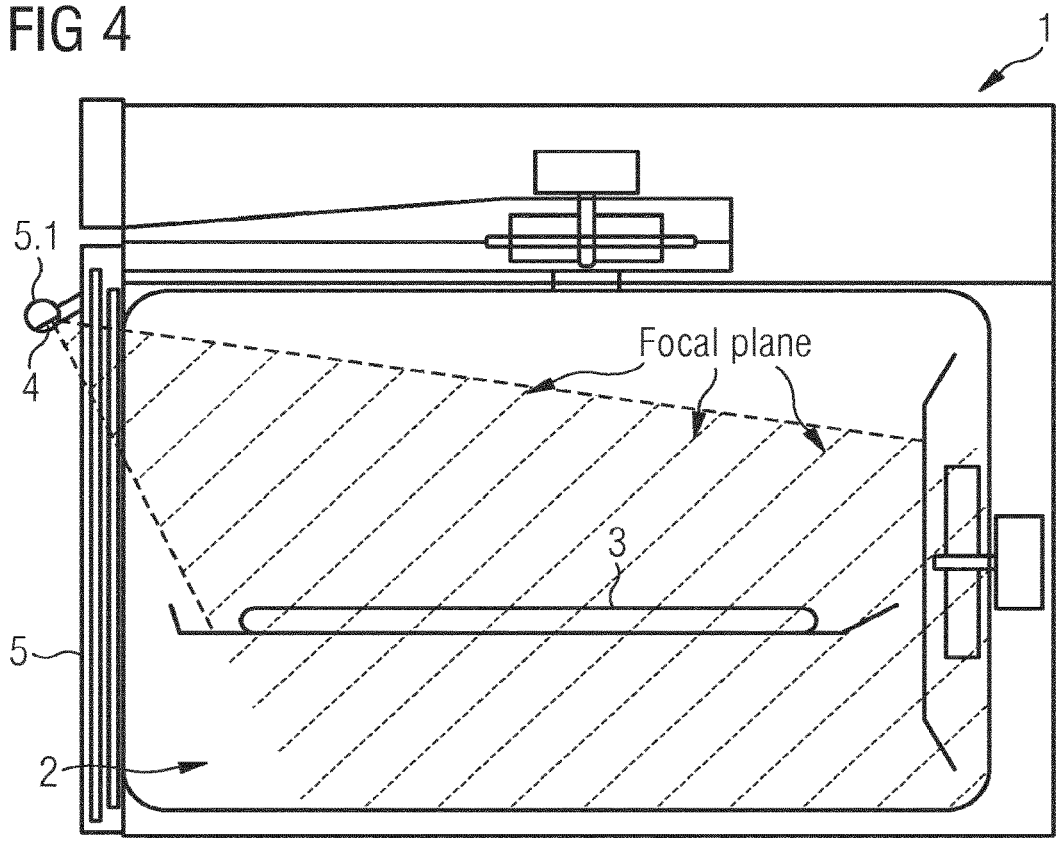
FIG. 4 illustrates multiple focal planes of a camera included in the oven door.

FIG. 4 shows a further embodiment of a food preparation entity 1 which is adapted to establish 3D-information of food 3 using multiple focus points. The general idea behind that approach is to gather information of food 3 received within the cavity 2 in different focal planes (indicated by the dashed lines in FIG. 4) which a parallel to each other (also referred to as focus stacking). By moving the focal plane through the three-dimensional food, 2D-slices through said food can be obtained wherein each slice refers to one focus plane. By combining multiple slices, the 3D-shape of said food 3 received within the cavity 2 can be obtained.

Said different focus plane information can be gathered in different ways. According to a first embodiment, a light field camera, also referred to as plenoptic camera, is used as camera 4. The light field camera comprises an array of micro-lenses. By means of said array of micro-lenses, it is possible to derive information regarding the direction of light rays traveling in space. So, in other words, said light field camera does not only gather information regarding the light intensity of a scene but also information regarding the direction of light received by the light field camera. So based on the information gathered by said light field camera it is possible to extract an image series with multiple focal points. Specifically, it is possible to extract an image series with multiple focal points from a single image captured by the light field camera.

According to other embodiments, said camera 4 may comprise a camera optics which is adapted to change the focus point of the camera 4. By changing the focus point, a series of images can be captured wherein each image is focused on a certain focus plane. By changing the focus plane through the food 3 received within the cavity 2, multiple slice-like images can be obtained. Similar to the embodiment using a light field camera, information gathered from said slices can be combined in order to obtain information regarding the 3D-shape of said food 3 received within the cavity 2.

It should be noted that also a combination of methods provided in the present disclosure is conceivable. So, for example, a light field camera or a camera comprising camera optics with changeable focus point can also be used in a food preparation entity 1 which is adapted to capture multiple images during a camera movement, e.g. door movement (as disclosed according to the embodiment of FIGS. 2 and 3).

The gathered 3D information of food can be used in multiple different ways. For example, said 3D information can be used for categorizing food 3 according to certain food types. For example, the food 3 received within the cavity 2 can be categorized as being a pastry or a piece of meat. Thereby, for example, a certain heating mode or certain cooking programs can be suggested.

Furthermore it is possible to monitor the food 3 during the cooking process. Said 3D information may be taken as reference information reflecting the initial situation and one or more further images may be captured during the cooking process in order to monitor the cooking process. Said one or more further images may be single 2D images or may be a series of images which comprise information of multiple focus planes. The volume change of said food 3 can be estimated by monitoring the time-dependent change of the food contour depicted in the one or more further images. Information gathered during said cooking process monitoring can be used for readiness control in a dough rising process or during a baking process of food with raising agents.

In addition, said 3D information can be used for calculating the temperature inside the food during the cooking process. Said temperature inside the food may be calculated according to the method disclosed in the European Patent EP 1 921 384 B1 which is herewith incorporated by reference.

Figure 5:
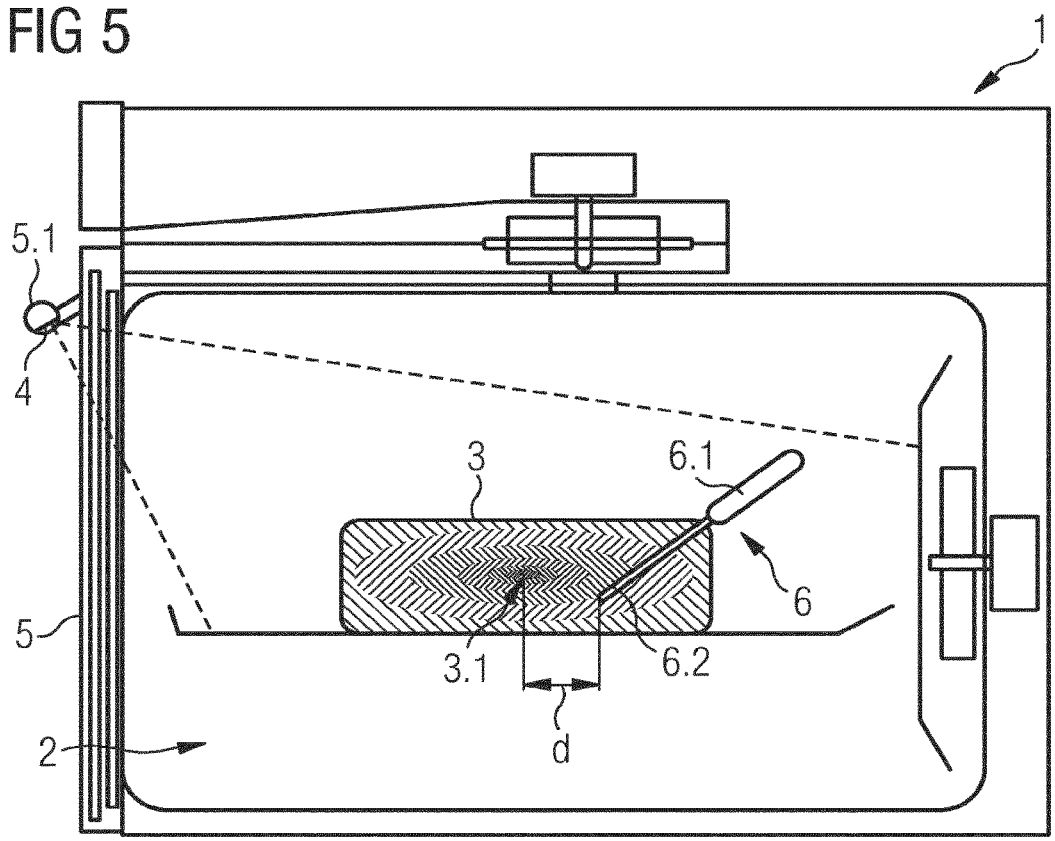
FIG. 5 illustrates an imprecisely positioned temperature sensor partly inserted in a food received within the cavity.
Figure 6:
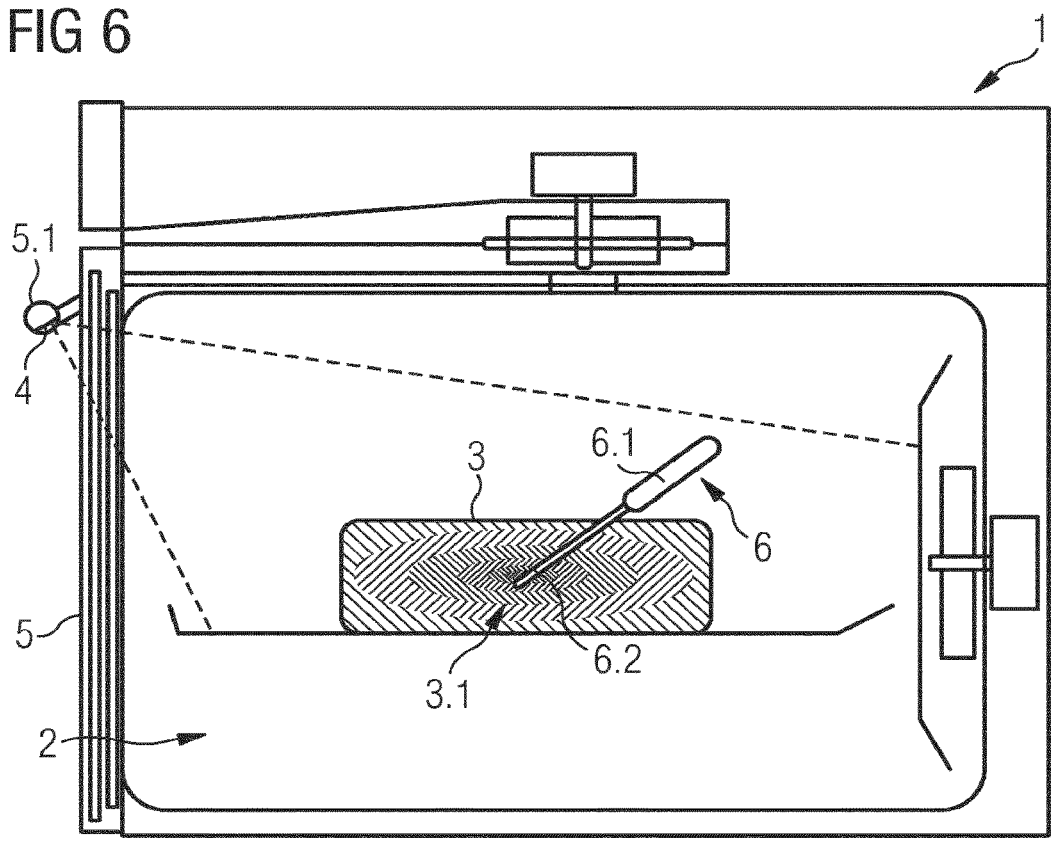
FIG. 6 illustrates a temperature sensor positioned with its sensing free end in the centre of food received within the cavity.

As shown in FIGS. 5 and 6, if a portion of a temperature sensor 6.1 protruding from said food 3 received within the cavity 2 is recognized, the position of said temperature senor 6 can be determined. Specifically, based on the angle of the temperature sensor 6 and the free length protruding from the surface of food 3, the position of the sensing portion 6.2 (which is included in said food 3 and which comprises the temperature sensor element) can be estimated. In other words, the position of the sensing portion 6.2 with reference to the 3D-shape of food 3 can be estimated.

In addition, based on the established information regarding the 3D-shape of food 3, the centre of said food 3 (which is typically the coldest point of food) can be determined. After determining the centre of said food 3 and based on the estimation of the position of the sensing portion 6.2, the distance d between the sensing portion 6.2 and the centre 3.1 of food 3 can be calculated.

In case that there is a significant distance d between the centre 3.1 of food 3 and the sensing portion 6.2, the temperature value provided by the temperature sensor 6 can be corrected. In other words, the temperature value provided by the temperature sensor 6 can be modified using a correction value (which is depending from the calculated distance d between the centre 3.1 of food 3 and the sensing portion 6.2) in order to obtain an adjusted temperature value.

It should be noted that the description and drawings merely illustrate the principles of the proposed method and food preparation entity. Those skilled in the art will be able to implement various arrangements that, although not explicitly described or shown herein, embody the principles of the invention.

LIST OF REFERENCE NUMERALS

1 Food preparation entity
2 cavity
3 food
3.1 centre of food
4 camera 5 door
5.1 door handle
6 temperature sensor
6.1 temperature sensor portion
6.2 sensing portion
d distance

The invention claimed is:

1. A method of monitoring a cooking parameter of a food item received within a cavity of a food preparation entity, the method comprising the steps of:
   capturing an initial series of images of said food item and processing the series of images to establish three-dimensional information of said food item;
   thereafter cooking said food item via a cooking process and capturing a subsequent image of said food item;
   estimating a volume change of said food item as a result of said cooking process based on said three-dimensional information and said subsequent image of said food item; and
   estimating a cooking parameter of said food item based on said volume change.

2. The method according to claim 1, said cooking parameter being one or more of a temperature inside said food item, or a degree of rise of said food item.

3. The method according to claim 2, further comprising monitoring an evolution of said cooking parameter of said food item corresponding to an evolution of said volume change based on successive subsequent images taken of said food item during said cooking process.

4. The method according to claim 1, wherein said initial series of images are captured from different focus points and/or focal planes of said food item.

5. The method according to claim 1, wherein said initial series of images are captured with a camera mounted in or to a door for closing said cavity, each of said initial series of images comprising a different viewpoint of said food item.

6. The method according to claim 1, further comprising:
   measuring a position of a sensing portion of a temperature sensor protruding from said food item; and
   adjusting temperature information provided by said temperature sensor based on a distance between the sensing portion and a center of said food item.

7. The method according to claim 6, said position of the sensing portion being measured based on a free length of the temperature sensor and an insertion angle of the temperature sensor protruding from said food item.

8. The method according to claim 1, wherein the subsequent image is a two-dimensional image of said food item.

9. The method according to claim 1, further comprising capturing a plurality of subsequent images of said food item during or after said cooking process comprising information of multiple respective focus planes.

10. A method of monitoring a cooking parameter of a food item received within a cavity of a food preparation entity, the method comprising the steps of:
    capturing a plurality of images of said food item during a cooking process;
    processing the plurality of images;
    estimating a volume change of said food item based on said plurality of images; and
    estimating a cooking parameter of said food item based on said volume change.

11. The method according to claim 10, wherein each of said plurality of images includes information comprising a contour of said food item; and wherein said volume change is estimated by monitoring a time-dependent change of the contours depicted in the respective images.

12. The method according to claim 10, said cooking parameter being one or more of a temperature inside said food item, or a degree of rise of said food item.

13. The method according to claim 10, further comprising monitoring an evolution of said cooking parameter of said food item corresponding to an evolution of said volume change based on said plurality of images of said food item.

14. The method according to claim 10, further comprising:
    measuring a position of a temperature sensor inserted in said food item relative to a center of said food item based on said plurality of images;
    measuring a distance between the temperature sensor and the center of said food item; and
    adjusting temperature information provided by said temperature sensor based on said measured distance.

15. The method according to claim 10, wherein said plurality of images comprise information of multiple respective focus planes or focus points of said food item.

16. The method according to claim 10, wherein said plurality of images are captured with a camera mounted to or in said food preparation entity, each of said plurality of images comprising a different viewpoint of said food item.

17. The method according to claim 10, wherein said plurality of images taken together comprise three-dimensional information of said food item, the method further comprising selecting an appropriate heating mode or cooking program of said food preparation entity based on said three-dimensional information.

* * * * *